Figure 1:
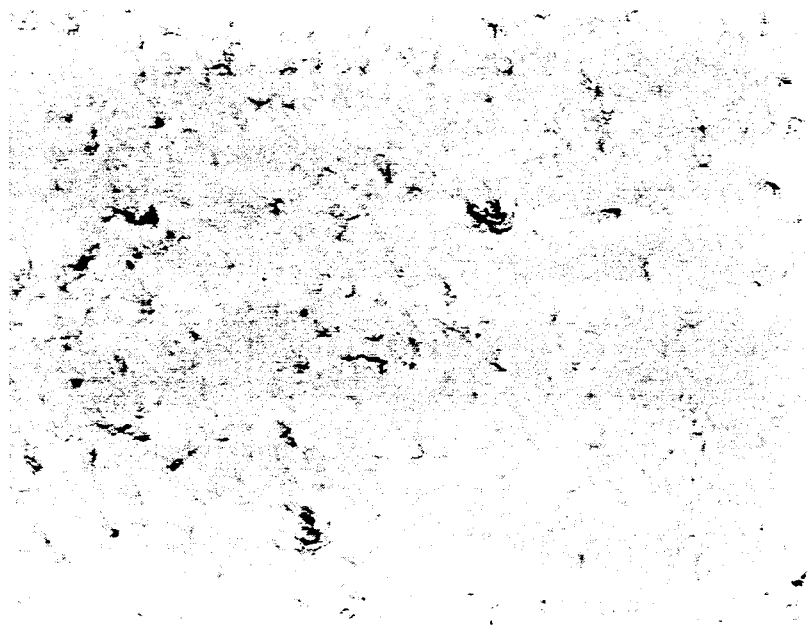

United States Patent [19]

Krijger et al.

[11] Patent Number: 5,186,862
[45] Date of Patent: Feb. 16, 1993

[54] PLASTIC GRANULATED MATERIAL WITH NON-DISPERSED ELECTRICALLY CONDUCTIVE FIBRE BUNDLES

[75] Inventors: Louis C. Krijger; Jozef M. A. Jansen, both of Geleen; Nicolaas G. M. Hoen, Stein; Laurentius W. Steenbakkers; Peter E. Froehling, both of Sittard, all of Netherlands

[73] Assignee: Stamicarbon B.V., Geleen, Netherlands

[21] Appl. No.: 423,881

[22] Filed: Oct. 19, 1989

[30] Foreign Application Priority Data

Oct. 20, 1988 [NL] Netherlands .......................... 8802584
Jul. 19, 1989 [NL] Netherlands .......................... 8901859

[51] Int. Cl.$^5$ ............................................... H01B 1/00
[52] U.S. Cl. ..................................... 252/512; 524/439; 428/375; 428/379; 428/402; 428/458
[58] Field of Search .................... 252/512; 524/439; 428/375, 379, 402, 458

[56] References Cited

U.S. PATENT DOCUMENTS 4,664,971  5/1987  Soens .................................. 252/512

Primary Examiner—Karl Group
Assistant Examiner—Anthony J. Green
Attorney, Agent, or Firm—Cushman, Darby & Cushman

[57] ABSTRACT

The invention relates to a plastic granulated material containing el?? ??ally ?? .ductive fibres, the degree of dispersion of w..ich fibres in the granulated material is 0.10 at most, the degree of dispersion being the reciprocal value of the volume fraction in % of a granule occupied by electrically conductive fibre bundles and measured according to the threshold value method.

Moulding compounds produced from the granules according to the invention have very high EMI values.

5 Claims, 1 Drawing Sheet

PLASTIC GRANULATED MATERIAL WITH NON-DISPERSED ELECTRICALLY CONDUCTIVE FIBRE BUNDLES

The invention relates to a plastic granulated material containing electrically conductive fibres.

Such a plastic granulated material is known from GB-A-2112796. Herein a plastic granulated material is described incorporating electrically conductive steel fibres, the fibres being distributed in the granules as evenly as possible. The granulated material is obtained by choosing, during the mixing of the fibres and the basic granulated material, such a shear stress as to be high enough for obtaining a proper dispersion of the steel fibres in the plastic granulated material, while preventing breakage of the steel fibres. This is done at relatively high temperatures.

The disadvantage of a plastic granulated material as described in GB-A-2112796 is that, during its production, segregation occurs in consequence of the high temperature during the mixing. This gives rise to clogging of the extrusion equipment used for the production of said granulated materials.

The object of the invention is now to provide a plastic granulated material incorporating electrically conductive fibres, with improved shielding properties of the moulding compound obtained from it, which granulated material can be produced without the said disadvantage.

The plastic granulated material according to the invention is characterized in that it consists of granules incorporating 0.3-4% (vol) electrically conductive fibre bundles with a degree of dispersion of 0.10 at most, which degree of dispersion is the reciprocal value of the volume fraction in % of a granule occupied by the electrically conductive fibre bundles, each comprising 60-20,000 fibres, and measured according to the threshold value method.

It has been found that with a plastic granulated material according to the invention clogging of the extrusion equipment is avoided. Despite the low degree of dispersion, i.e. a poor distribution of the fibres in a granule, the plastic granulated materials have been found to be excellently suited to be processed by, for instance, injection moulding to form moulding compounds with excellent shielding properties. This is very surprising, because in the said publication it was stated that the fibres should be incorporated in the plastic granulated material in a very well dispersed condition if in a moulding compound good shielding properties against electromagnetic interference (EMI) were to be obtained.

It was found also that the low degree of dispersion of the fibre bundles in the plastic material results in reduced fibre breakage. This is due to the presence of fibre bundles instead of fibres. A fibre bundle is less prone to breakage, so that breakage is suppressed. As a result, a reduced loading of the fibres is acceptable.

The granules according to the invention preferably have a degree of dispersion lower than 0.08. The degree of dispersion is defined as the reciprocal value of the volume fraction (Vv) in % of a granule occupied by steel fibre bundles, measured by the threshold value method. The threshold value method consists in the determination of Vv by means of digital picture processing and picture analysis. In order to obtain a reliable indication of Vv, the granules are moulded to form a small sheet.

By means of digital picture processing, a picture of a flat cross section of a moulded sheet is converted, via a video camera and a digital converter, to form a matrix with a great many dots. Every dot is awarded a discrete value corresponding with the intensity of light in the starting picture; for instance, black will be 0, white will be 255, and intermediate intensities are divided pro rata. The principle of this method is mentioned in A. Rosenfeld, A. C. Kak, 'Digital Picture Processing', vols. 1 and 2 (1982). By choosing a threshold value in the discretized intensities it is possible for the steel fibre bundles to be distinguished from the plastic matrix and for the surface fraction (AA) occupied by the steel fibre bundles in the cross section to be measured. On the grounds of geometric/statistical considerations it is possible to conclude that, irrespective of the shape or size of the structures, the surface fraction (AA) is the same on average as the desired volume fraction (Vv). This is described in E. R. Weibel, 'Stereological Methods', vol. 2, 1980.

The chosen threshold value is determined by the quantity of fibre present per mm2 surface area. The chosen threshold value must be such that in cross section the area covered by cut fibres is at least 5% of the total surface. Preferably at least 10%. With a fibre diameter of $2-15\mu$, the number of fibres may then range from 500-25,000 fibres per mm2 cross section. If the quantity of fibre per mm2 cross section is lower than 500, the difference in light intensity of the starting picture and of the parts in which fibres do not or hardly occur will be too small for a proper distinction to be made.

The electrically conductive fibre bundle used in the plastic granulated material according to the invention is preferably a steel fibre bundle comprising 60-20,000 fibres, preferably 2000-15,000, the discrete fibre length, which may vary for each fibre individually, being for instance 4-8 mm.

The fibres in a fibre bundle are preferably impregnated with a resin. The production of such fibre bundles is described in, for instance, U.S. Pat. No. 2,050,298, U.S. Pat. No. 3,042,570, U.S. Pat. No. 2,877,501 and U.S. Pat. No. 2,877,501. Such bundles are known as 'grains'.

The plastic in the granulated material according to the invention is generally a thermoplastic polymer composition. It includes polyolefins, particularly polypropylene and polyethylene; copolymers, particularly styrene acrylonitrile and styrene maleic anhydride copolymers; nylon; polyphenylene oxides; polyphenylene oxide-polystyrene mixtures; polyphenylene sulphides; polyacetals; polysulphones; polycarbonates; polyurethanes; cellulose esters; amorphous and/or crystalline polyesters, for instance polyethylene terephthalate, polyoxybenzoyl polyesters; polymonochlorostyrene; acryl polymers, polyvinylchlorides; polyvinylidenechlorides; copolymers of vinylchloride and vinylidenechloride; various thermoplastic elastomers, for instance based on styrene and butadiene or ethylene or propylene and mixtures of said plastics.

The invention also comprises the process by which the plastic granules according to the invention are obtained. The process is characterized in that the electrically conductive fibre bundles and the plastic granulated materials are mixed with each other at a low shear stress, in which mixing process the temperature is kept below the melting temperature of the plastic.

With the process according to the invention preference is given to mixing grains with the plastic. A granule is obtained in which steel fibre bundles are hardly or not dispersed, in other words in which the degree of dispersion is lower than 0.10, measured according to the threshold value method. It is essential during the mixing for the temperature to be below the normal processing or melting temperature (Tsm) if present, but above the softening temperature (Tv) or glass-temperature (Tg) of the thermoplastic polymer. Preferably at a maximum of 50° C. above Tv or Tg. This particularly applies to that portion of the mixing device where the fibre bundles or grains are added to the plastic.

GB-A-2150936 describes a process in which plastic and steel fibre bundles are mixed with each other at a low shear stress, but at high temperatures. The granules thus obtained show a uniform dispersion of steel fibres in the thermoplastic matrix. The degree of dispersion of these granules is considerably higher than 0.10.

As mixing device, the customary mixing devices are suitable. Preference is given to the use of a single or twin screw extruder, optionally fitted with a progressive core screw, or to a kneader without direct pressure build-up.

Preference is given to the use of a single screw extruder with a progressive core screw, or of a kneader without direct pressure build-up.

Moulding compounds wholly or partly produced from the plastic granulated material according to the invention have excellent properties in respect of electromagnetic interference. This makes the plastic granulated material according to the invention excellently suited for being moulded to form computer housings, etc.

The moulding compounds can be obtained from the granules using the processing techniques known in the art, for instance injection moulding. In the injection moulding process the bundles will fall apart to form steel fibres, which will uniformly disperse in the plastic matrix. As in the production of the granules no breaking of the fibre bundles occurred, caused by the low shear stress and the poor dispersion, a maximum shielding effect is obtained in a final moulding compound.

To the plastic granulated materials according to the invention the usual additives can be added, for instance stabilizers, pigments, lubricants and organic or inorganic fillers or reinforcing agents.

EXAMPLES I, II AND COMPARATIVE EXAMPLES A AND B

In a Schwabenthan U single screw extruder an acrylonitrilebutadiene-styrene graft copolymer (ABS, Ronfalin FG-50R, DSM) was extruded together with steel fibre bundles (BekaertR GR 75 C 10). The steel fibre bundles were metered into the devolatizing opening in the form of grains in amounts of 1% (vol) (=9.6% (wt)).

On the extruder the following temperatures were set, T1 being the temperature at the extruder inlet, T2 the temperature just before the devolatizing opening and T4 the temperature at the extruder head (Tv ABS: ~95° C.).

| Ex. | I | II | A | B |
|---|---|---|---|---|
| T1° C. | 60 | 60 | 220 | 220 |
| T2° C. | 110 | 110 | 230 | 230 |
| T3° C. | 230 | 230 | 230 | 210 |
| T4° C. | 210 | 210 | 220 | 200 |
| Temp. at inlet of fibre bundles (After T2): | | | | |
| | 131 | 110 | 222 | 232 |

Using a Schreeder granulator granules were obtained from the extruder. The granules of examples I and II differ visually from the granules of examples A and B in that they contain tufts of steel fibre bundles, which are not present in the granules obtained by applying processes A and B. The latter showed a high degree of fibre dispersion as described in GB-A-2112796.

From a part of the granules obtained test plates ($10 \times 5 \times 0.2$ cm$^3$) were moulded under the same conditions.

Figure 2:

FIGS. 1 and 2 comprise two photos of a part of the surface of the test plates obtained with the granules of comparative example A and example II. The two photos were enlarged 6 times.

From a test plate obtained five cross sections were cut ($5 \times 0.2$ cm2) and analysed by means of digital picture processing.

The light intensity at the place where steel fibre bundles are present is much lower in the picture than at a place where steel fibre occurs in a dispersed state.

In order to measure the surface fraction occupied by the fibre bundles the threshold value was set at 80. This meant that all surface units with a value $<80$ could be counted; the result was used for determining fraction (AA). Of the five values found for each test plate the average surface fraction (AA=Vv) was determined (see table 2).

Granules obtained by applying the processes mentioned in table 1 were processed on an Arburg injection moulding machine to form threshold plates (final product). Of the threshold plates obtained, the shielding value (EMI) was determined using the Bekiscan R-CP method (Bekaert S.A., Belgium). The results are mentioned in table 2.

TABLE 2

| Ex. | Vv(=AA) | degree of dispersion | EMI value (%) |
|---|---|---|---|
| A | 5 | 0.200 | 72 |
| B | 7 | 0.143 | 78 |
| I | 13.1 | 0.076 | 89 |
| II | 12.8 | 0.078 | 86 |

The examples show that granules containing tufts of steel fibre bundles (i.e. little or no dispersion) will result in an improved shielding effect in a final moulding compound.

We claim:

1. A granulated thermoplastic polymer composition containing electrically conductive fibers, consisting of:
    granules incorporating 0.3-4% (vol) electrically conductive fiber bundles with a degree of dispersion of 0.01 to 0.10, wherein the degree of dispersion is the reciprocal value of the volume fraction in % of a granule occupied by the electrically conductive fiber bundles, each comprising 60-20,000 fibers, and measured according to the threshold value method.

2. A granulated thermoplastic polymer composition according to claim 1, wherein the degree of dispersion is 0.01 to 0.08.

3. A granulated thermoplastic polymer composition according to claim 1, wherein the thermoplastic polymer is selected from the group consisting of polyolefins, styrene acrylonitrile and styrene maleic anhydride copolymers, nylon, polyphenylene oxides, polyphenylene oxide-polystyrene mixtures, polyphenylene sulphides, polyacetals, polysulphones, polycarbonates, polyurethanes, cellulose esters, polyesters, polymonochlorostyrene, acryl polymers, polyvinylchlorides, polyvinylidenechlorides, copolymers of vinylchloride and vinylidenechloride, and thermoplastic elastomers.

4. A granulated thermoplastic polymer composition according to claim 1, wherein the electrically conductive fibers are made of steel.

5. A molding compound comprising;
the thermoplastic polymer composition of claim 1, mixed with at least one of the following additives selected from the group consisting of stabilizers, pigments, lubricants, organic fillers, inorganic fillers and reinforcing agents.

* * * * *